(12) United States Patent
Chen et al.

(10) Patent No.: US 9,367,737 B2
(45) Date of Patent: Jun. 14, 2016

(54) FLOOR PLAN SPACE DETECTION

(75) Inventors: Henry Chen, Beijing (CN); Jian Geng Du, Beijing (CN); Yan Xia, Beijing (CN); Xiaoli Wang, Beijing (CN); Liana M. Kiff, Minneapolis, MN (US); Tom Plocher, Hugo, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/384,408

(22) PCT Filed: Mar. 19, 2012

(86) PCT No.: PCT/CN2012/072520
§ 371 (c)(1),
(2), (4) Date: Sep. 11, 2014

(87) PCT Pub. No.: WO2013/138975
PCT Pub. Date: Sep. 26, 2013

(65) Prior Publication Data
US 2015/0131871 A1 May 14, 2015

(51) Int. Cl.
*G06K 9/00* (2006.01)
*G06T 7/00* (2006.01)
*G06T 7/60* (2006.01)
*G06T 5/00* (2006.01)

(52) U.S. Cl.
CPC .......... *G06K 9/00476* (2013.01); *G06T 5/002* (2013.01); *G06T 7/0081* (2013.01); *G06T 7/602* (2013.01); *G06T 2207/20141* (2013.01); *G06T 2207/20156* (2013.01); *G06T 2207/20182* (2013.01); *G06T 2210/04* (2013.01)

(58) Field of Classification Search
None
See application file for complete search history.

(56) References Cited

U.S. PATENT DOCUMENTS

2009/0160856 A1* 6/2009 Hoguet ................. G06Q 10/06
345/420

FOREIGN PATENT DOCUMENTS

CN     1851731 A  * 10/2006

OTHER PUBLICATIONS

Chen, Zhichao, and Stanley T. Birchfield. "Visual detection of lintel-occluded doors from a single image." Computer Vision and Pattern Recognition Workshops, 2008. CVPRW'08. IEEE Computer Society Conference on. IEEE, 2008.*

* cited by examiner

*Primary Examiner* — Stephen R Koziol
*Assistant Examiner* — Amandeep Saini
(74) *Attorney, Agent, or Firm* — Brooks, Cameron & Huebsch, PLLC

(57) ABSTRACT

Methods, machine-readable media, and devices for floor plan space detection are described herein. For example, one or more embodiments include receiving an image of a floor plan, enhancing the image of the floor plan through processing, detecting a location of a door associated with a space in the image of the floor plan through a histogram of gradient of pattern feature, setting a seed in the space based on the location of the door associated with the space, spreading the seed in the space until the seed reaches a boundary of the space, and associating the seed that has been spread with the space.

19 Claims, 5 Drawing Sheets

FLOOR PLAN SPACE DETECTION

This application is a National Stage Application under 35 U.S.C. §371 of International Application Number PCT/CN12/72520, filed Mar. 19, 2012 and published as WO 2013/138975 on Sep. 26, 2013, the entire contents of which are incorporated herein by reference in its entirety.

TECHNICAL FIELD

The present disclosure relates to methods, machine-readable media, and devices for floor plan space detection.

BACKGROUND

A spatial representation of a floor plan can include a representation of space within areas of a structure that are not obstructed by columns, and/or walls, for example. A spatial representation of a floor plan can be used in energy analysis, energy optimization, a smoke propagation prediction, access control configuration, and/or in creating a Building Information Model (BIM), for example.

The spatial representation of the floor plan can be expressed in a BIM, for example, which can provide a model of 3-dimensional (3D) space within areas of the structure. Few structures, however, have a BIM and creating a BIM for a structure can involve significant time and resources.

In an example, buildings can come with floor plan drawings in Drawing (DWG) and Drawing Interchange Format (DXF) formats and can be cluttered with various objects (e.g., electrical conduits, smoke detectors) on the image of the floor plan. Rendering 3D graphics from these floor plan images can be difficult and can require manual cleanup of the images to remove the various objects, which can be time-consuming.

Space information can be obtained from a floor plan of a structure for creating a BIM by manually drawing spaces associated with the structure in a design system. Manually drawings spaces, however, can take substantial time and resources.

DETAILED DESCRIPTION

Figure 1:
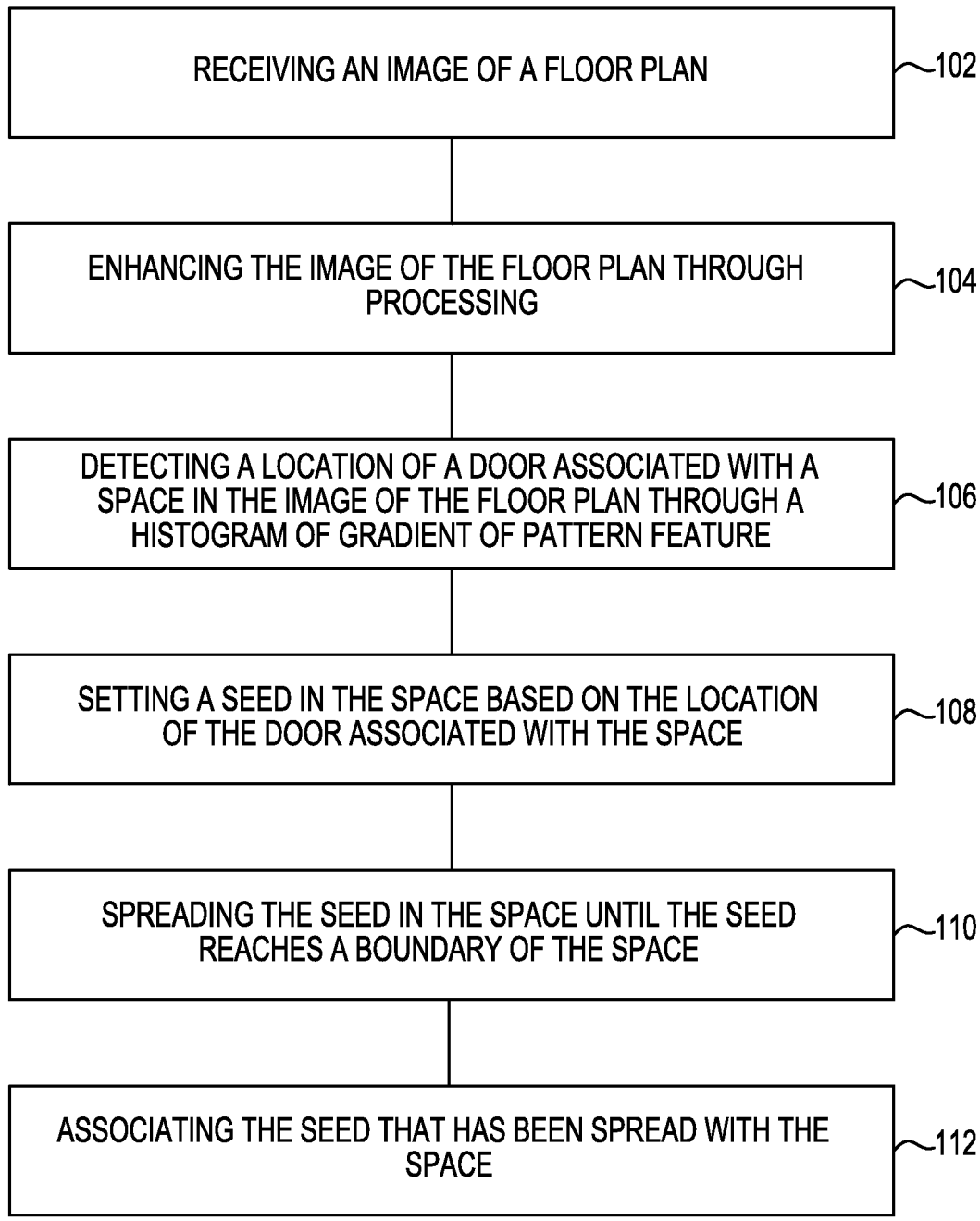
FIG. 1 illustrates a method for floor plan space detection according to one or more embodiments of the present disclosure.

Methods, machine-readable media, and devices for floor plan space detection are described herein. For example, one or more embodiments include receiving an image of a floor plan, enhancing the image of the floor plan through processing, detecting a location of a door associated with a space in the image of the floor plan through a histogram of gradient of pattern feature, setting a seed in the space based on the location of the door associated with the space, spreading the seed in the space until the seed reaches a boundary of the space, and associating the seed that has been spread with the space.

An image of a floor plan can be in various image formats. For example, an image of a floor plan can be in a vector image and/or a raster image. A vector image is an image that can include a collection of lines and/or curves connected by nodes and can form objects. Each node, line, and/or curve can be defined in a drawing by a mathematical description. A raster image is an image that can include a collection of pixels (e.g., squares, dots). As such, vector images can be defined as object-oriented, while raster images can be defined as pixel oriented.

As a result of various image formats that images of floor plans can include (e.g., vector, raster), determining space associated with the image of the floor plan can take substantial time and/or resources. Some embodiments of the present disclosure can provide for detection of the space in a floor plan regardless of whether the image of the floor plan is a vector and/or raster image.

When determining space from an image of a floor plan, a result of the determination can be skewed as a result of a program failing to identify an area for detection of space in the area. For example, in an image of a floor plan that includes various rooms for which space information is desired, one or more of the various rooms can be neglected when determining the space from the image of the floor plan. Some embodiments of the present disclosure can provide a result checking mechanism to ensure that space information can be determined for all areas in a structure.

Alternatively, and/or in addition, results of the determination can be skewed as a result of the program failing to correctly identify a portion of an area. For example, a boundary of an area (e.g., wall, column) can be neglected, causing an incorrect determination of space in the area. Some embodiments of the present disclosure can improve the precision of space detection from the image of the floor plan.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

As used herein, "a" or "a number of" something can refer to one or more such things. For example, "a number of differences" can refer to one or more differences.

FIG. 1 illustrates a method for floor plan space detection according to one or more embodiments of the present disclosure. At block 102, the method can include receiving an image of a floor plan. The image of the floor plan can be in various formats including a vector format and/or raster format. Vector formats can include Drawing (DWG) and Drawing Interchange Format (DXF) by Autodesk, Initial Graphics Exchange Specification (IGES), Standard for the Exchange of Product model Data (STEP), Scalable Vector Graphics (SVG), for example. Raster formats can include Windows Bitmap (BMP), Tagged Image File Format (TIF), Joint Photographic Experts Group (JPEG), Graphic Interchange Format (GIF), and/or Portable Network Graphic (PNG).

As discussed herein, receiving the image of the floor plan can include receiving the image of the floor plan as a vector image. When the image of the floor plan is received as a vector image, the method can include enhancing the image of the floor plan through processing, at block 104. The processing can include transforming the vector image into a raster image and performing binarization of the raster image. Binarization of the raster image can include converting a plurality of colors in the raster image to two colors.

For example, prior to the transformation of the vector image into the raster image and/or after the transformation of the vector image into the raster image, the image can include portions of the image that are black, white, gray scale, and/or other colors. After binarization of the image, the gray scale portions and/or other color portions of the image can be converted to black and/or white, such that the entire image is formed of black and white pixels.

Alternatively, and/or in addition, some embodiments of the present disclosure can include receiving the image of the floor plan as a raster image. When the image of the floor plan is received as a raster image, the method can include enhancing the image of the floor plan through processing. The processing can include performing binarization of the raster image in a manner such as that discussed in relation to binarization of the vector image.

Alternatively, and/or in addition, the processing can include removing noise in the raster image. In an example, noise in the image can cause pixels in an image to be a different color or intensity from their surrounding pixels. Removing noise in the raster image can be performed through use of a noise reduction algorithm.

Alternatively, and/or in addition, the processing can include performing a morphology operation to smooth sawtooth edges of lines and bridge unconnected pixels that form lines. Morphology operations can be used for processing and analysis of geometrical structures in an image.

In an example, a wall depicted in the image of the floor plan can include a number of object pixels (e.g., pixels forming the wall) extending from an edge of the wall and a number of background pixels (e.g., pixels forming the background) between the number of object pixels, creating an appearance that the edge of the wall has a saw-tooth edge. The saw-tooth edge of the wall can be removed through the morphology operation by converting background pixels between the number of object pixels into object pixels, thus smoothing the edge of the wall.

In an example, the wall depicted in the image of the floor plan can include a number of object pixels that are not connected. For instance, background pixels can be in between the object pixels of the wall, creating an appearance that a number of portions of the wall are not connected with one another. The number of un-connected portions of the wall can be connected through the morphology operation by converting the background pixels between the number of un-connected portions of the wall into object pixels.

The method includes, at block 106, detecting a location of a door associated with a space in the image of the floor plan through a histogram of gradient of pattern feature and is discussed further in relation to FIGS. 2A to 2G. A histogram of gradient of pattern feature can be used in image processing for detecting objects in an image. In an example, the histogram of gradient can be based on distribution of intensity gradients of individual and/or groups of pixels. For example, a histogram of gradient of pattern feature can be stored for a sample door and used for identification of doors associated with the space in the image of the floor plan. The histogram of gradient of pattern feature is discussed further in relation to FIG. 2D.

The method includes, at block 108, setting a seed in the space based on the location of the door associated with the space. The seed can be defined as a point (e.g., pixel, group of pixels) from which an algorithm can be used to grow the seed until the seed reaches a boundary of the space that is associated with the door. In an example, each door in a structure can be associated with one or more spaces. By detecting each door in the structure and setting a seed based on the location of the door, space information can be obtained for the structure.

In an example, setting the seed in the space based on the location of the door associated with the space can include setting the seed at a location proximate to the door and/or doorway associated with the space. For instance, the seed can be set at a location that touches the door and/or doorway, in a middle of the space, and/or on an opposite side of the space from the door and/or doorway.

The door associated with the space can be associated with a first space and a second space. For example, the door can be a point where two spaces meet. Accordingly, in some embodiments, the method can include setting a first seed on a first side of the door associated with the first space and a second seed on the second side of the door associated with the second space. As such, each seed can be used for finding the space associated with the respective seed.

The method includes, at block 110, spreading the seed in the space until the seed reaches a boundary of the space. In an example, spreading the seed can include adding pixels to the seed that are adjacent to the seed until the seed reaches a boundary of the space. The boundary of the space can be defined by a wall, column, doorway, and/or door, for example.

In some embodiments, blocks of pixels can be added to the seed. For example, when spreading the seed, a 2×2 block, 3×3 block, and/or 4×4 block of pixels can be added to the seed.

In some embodiments, the space can be set to a first color (e.g., black) and the door and/or doorway associated with the space and a boundary of the space in the image of the floor plan can be set to a second color different than the first color (e.g., white). Alternatively, and/or in addition, the seed can be marked as processed and all other pixels within the space can be marked as unprocessed. As such, a determination can be made based on the color of the space and the color of the boundary of the space of how far the seed should spread before the seed reaches a boundary of the space.

In some embodiments, an algorithm can be used to find a sum of pixel values within a radius from the seed and can be given by the equation, $\text{Sum}=\Sigma(\text{abs}(I(x+m,y+n)-I(x,y)))$, $(m,n<\text{radius})$, where $I(x,y)$ is the pixel value of the seed at x-coordinate and y-coordinate of the image, and $I(x+m, y+n)$ represents the pixel value of the space in the image within the radius from the seed. Pixel values can include numerical values based on the color and/or intensity of the pixel and/or group of pixels. Increases in x and y coordinates from the seed at which the radius is taken can be represented by m and n, respectively.

The algorithm can be used to determine when the seed has reached the boundary of the space. For example, when the space that is to be filled by the seed is black in color, the seed can be black in color. As such, the pixel value of the seed can have a value of 0 and the pixel value of the space in the image within the radius from the seed can have a value of 0, for example. The calculation performed by the algorithm, therefore, can be $\text{Sum}=\Sigma(\text{abs}(0-0))$, which equals 0. This can indicate that the seed has not reached the boundary of the space.

For instance, when an output from the algorithm is zero, this can indicate that there is space between the seed and the boundary of the space that can be filled by the seed. The pixels within the radius from the seed can then be added to the seed and can be marked as processed.

When the seed has reached the boundary of the space, which can be white in color, the pixel value of the seed can have a value of 0 and the pixel value of the boundary of the space in the image can have a value of 1, for example. The calculation performed by the algorithm, therefore, can be $\text{Sum}=\Sigma(\text{abs}(1-0))$, which does not equal 0. This can indicate that the seed has spread to the boundary of the space because no new pixels within the radius have a value of 0. As a result, an indication can be made that the seed has spread to the boundary of the space.

Spreading the seed can be implemented by performing a loop, for example, a number of pixels can be added to the seed in a first loop, a second number of pixels can be added to the seed in the second loop, etc. The loop can be implemented by storing the seeds that have been set in the space in a seed list. A seed from the seed list can be selected and the algorithm can be run on the seed. The algorithm can be run until an output of the algorithm is non-zero, indicating that the seed has spread up to the boundary of the space.

Upon indication that the seed has spread to the boundary of the space, the algorithm can be run on a second seed in the list, for example. Alternatively, and/or in addition, the algorithm can be run on a number of seeds simultaneously.

At block 112, the method can include associating the seed that has been spread with the space. In an example, the seed can be spread throughout the space in the image of the floor plan so that the seed covers the space up to the boundaries of the space. As such, an association between the space and the seed can be made. For instance, coordinates of the outer portion of the seed can be determined and associated with the space.

Figure 2A:
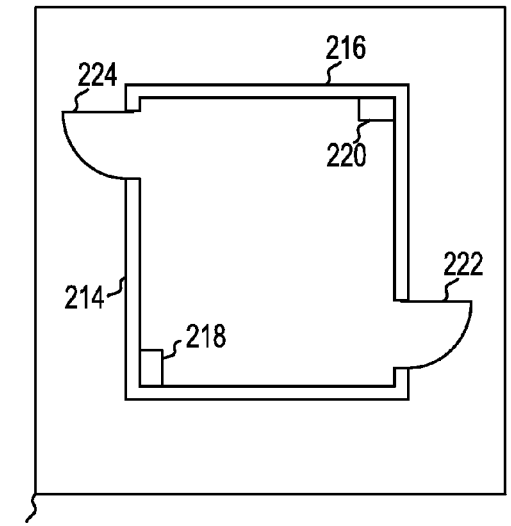
FIG. 2A illustrates an image of a floor plan on which floor plan space detection can be performed according to one or more embodiments of the present disclosure.

FIGS. 2A to 2G illustrate steps involved with detecting the location of the door associated with the space. FIG. 2A illustrates an image of a floor plan on which floor plan space detection can be performed according to one or more embodiments of the present disclosure. The image of the floor plan 213-1 includes walls 214 and 216, columns 218 and 220, as well as doors 222 and 224. In some embodiments disclosed herein, seeds can be set in a space based on the location of the door associated with the space. In order to determine the location of the door so the seeds can be set in place, some embodiments can include detecting the location of the door associated with the space in the image of the floor plan 213-1.

In an example, detecting the location of the door can include detecting long lines in the image of the floor plan 213-1 with a Hough transformation. A Hough transformation can be an image processing technique for isolating features of a particular shape within an image. For example, the long lines that form the walls 214 and 216 in the image of the floor plan 213-1 can be detected by the Hough transformation, as discussed in relation to FIG. 2B.

Figure 2B:
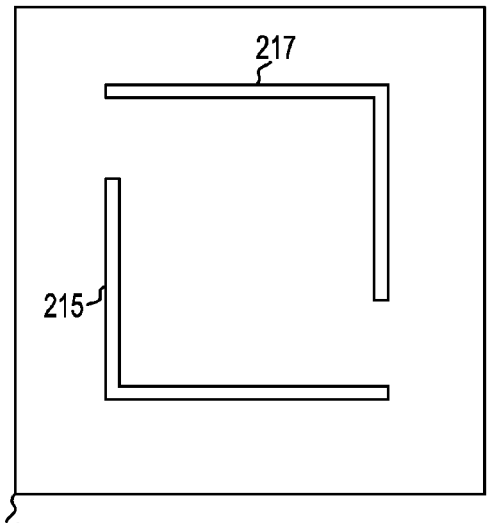
FIG. 2B illustrates a step in detecting long lines in the image of the floor plan according to one or more embodiments of the present disclosure.

FIG. 2B illustrates a step in detecting long lines in the image of the floor plan according to one or more embodiments of the present disclosure. In an example, the long line 215 in the long line image of the floor plan 213-2 can be the long line that forms a portion of the wall 214 in FIG. 2A and the long line 217 in the long line image of the floor plan 213-2 can be the long line that forms a portion of the wall 216 in FIG. 2A.

Figure 2C:
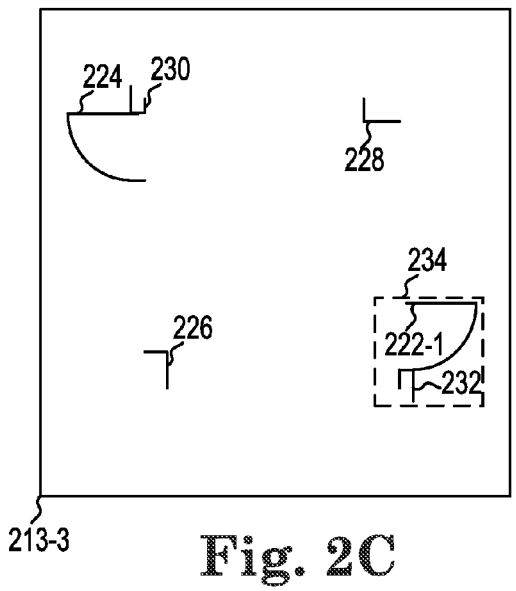
FIG. 2C illustrates a step in removing long lines from the image of the floor plan and selecting an image of a sample door according to one or more embodiments of the present disclosure.

FIG. 2C illustrates a step in removing long lines from the image of the floor plan and selecting an image of a sample door according to one or more embodiments of the present disclosure. As shown in FIG. 2C, the long lines 215 and 217 of FIG. 2B have been removed with, for example, a filter; leaving the door 224 and sample door 222-1, portions of column lines 226 and 228, and wall segments 230 and 232 in a filtered image of the floor plan 213-3. Since only the long lines 215 and 217 of FIG. 2B were removed, the wall segments 230 and 232 are left.

In some embodiments, detecting the location of the door associated with the space in the image of the floor plan can include receiving a selection 234 of an image of a sample door 222-1 from the filtered image of the floor plan 213. The selection 234 of the image of the sample door 222-1 can be obtained from a user through a user interface when the user marks the sample door 222-1 by making the selection 234 of the image of the sample door 222-1. The selection 234 of the image of the sample door 222-1 can be made such that the selection includes the sample door 222-1, a portion of the sample door 222-1, the sample door 222-1, and/or a portion of a surrounding feature such as wall segment 232.

Figure 2D:
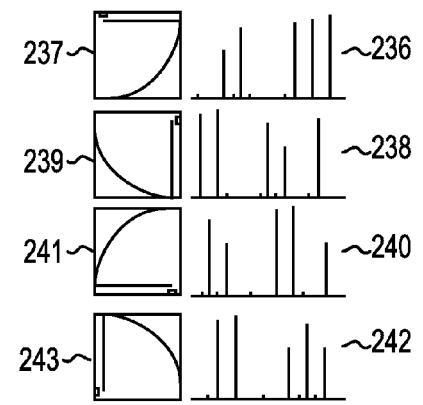
FIG. 2D illustrates a step in determining a histogram of gradient of pattern feature of a sample door according to one or more embodiments of the present disclosure.

FIG. 2D illustrates a step in determining a histogram of gradient of pattern feature of a sample door according to one or more embodiments of the present disclosure. Histogram of gradient of pattern features of the sample door 222-1 of FIG. 2C can be calculated for the sample door 222-1. In an example, a feature vector of a pixel in the image and/or group of pixels in the image of the sample door from the image of the floor plan can be calculated. A feature vector can be a dimensional vector that can represent an object through numerical features.

In an example, a first pixel at a first location that is black can have a different feature vector than a second pixel at a second location that is white. For instance, a pixel in a space can have a different feature vector than a pixel that makes up the image of the sample door. As such, pixels that make up an image of the sample door 222-1 can have different feature vectors, respectively. As such, a pattern among a plurality of feature vectors of a plurality of pixels in the image of the sample door 222-1 can be determined. The pattern can then be associated with the sample door to create the histogram of gradient of pattern feature. The histogram of gradient of pattern feature can then be used to identify other images of doors.

In some embodiments, the histogram of gradient of pattern feature can be determined for different rotations of the sample door. Doors in an image of a floor plan can be at different rotations, depending on an orientation of the door in the floor plan. As such, a single histogram of gradient of pattern feature for a door that is oriented in a normal position may not be useable for identifying doors that are mounted in 90, 180, or 270 degree orientations from normal.

To account for this, a histogram of gradient of pattern feature can be determined for an image of a sample door at 90, 180, and 270 degree orientations by rotating the image of the sample door by 90, 180, and 270 degrees and then determining the histogram of gradient of pattern feature at each rotation, respectively. For example, a normal histogram of gradient of pattern feature 236 can be calculated for a sample door at a normal position 237; a 90 degree histogram of gradient of pattern feature 238 can be calculated for a sample door at a 90 degree position from normal 239; a 180 degree histogram of gradient of pattern feature 240 can be calculated for a sample door at a 180 degree position from normal 241; and/or a 270 degree histogram of gradient of pattern feature 242 can be calculated for a sample door at a 270 degree position from normal 243, for example.

In some embodiments, an image of a door may be at an angle between normal and 90 degrees; 90 and 180 degrees, 180 and 270 degrees, and/or 270 degrees and normal, for example. As such, histogram of gradient of pattern features can be calculated for angles between those discussed herein.

In some embodiments of the present disclosure, detecting the location of the door associated with the space in the image of the floor plan through the histogram of gradient of pattern feature can include comparing the histogram of gradient of pattern feature of the door associated with the space with a histogram of gradient of pattern feature of a sample door. Upon comparison of the histogram of gradient of pattern feature of the door associated with the space with the histogram of gradient of pattern feature of the sample door, a determination can be made of whether the histogram of gradient of pattern feature of the door associated with the space is within a threshold of the histogram of gradient of pattern feature of the sample door.

Figure 2E:
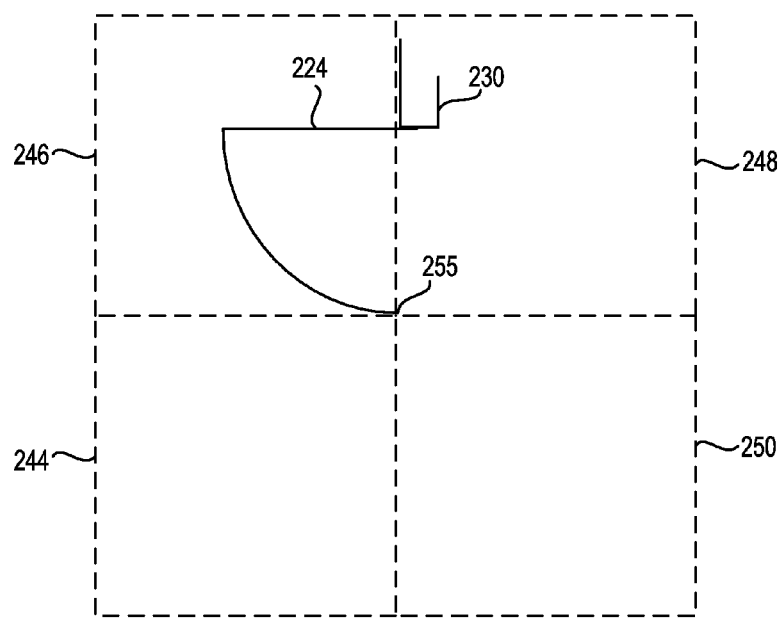
FIG. 2E illustrates a step in determining a histogram of gradient of pattern feature of a portion of the image of the floor plan according to one or more embodiments of the present disclosure.

FIG. 2E illustrates a step in determining a histogram of gradient of pattern feature of a portion of the image of the floor plan according to one or more embodiments of the present disclosure. In some embodiments, detecting the location of the door associated with the image of the floor plan can include detecting a group of pixels that have at least one pixel of the second color 255 (e.g., white). The filtered image of the floor plan (e.g., FIG. 2C, 213-3) can be used when detecting the group of pixels. For ease of illustration, FIGS. 2A to 2C and FIGS. 2E to 2G illustrate the doors and boundaries (e.g., columns, walls) as black, however, when performing the floor plan space detection, the doors and boundaries can be set to white, for example.

As discussed in relation to FIG. 1, the doors and boundaries can be set to the second color. Because the long lines (e.g., walls) can be removed from the filtered image of the floor plan, fewer pixels of the second color can be present. This can reduce the number of pixels of the second color that can be detected, thus helping to decrease the processing resources, since only pixels related to the door 224, column, and/or wall segment 230 are present, for example.

In some embodiments, detecting the location of the door associated with the image of the floor plan can include calculating a histogram of gradient of pattern feature of a region of pixels proximate to the group of pixels that have at least one pixel of the second color 255. In an example, the histogram of gradient feature can be calculated for four regions 244, 246, 248, and 250, although a different number of regions can be used. The four regions 244, 246, 248, and 250 can be centered around the group of pixels that have at least one pixel of the second color 255.

Groups of pixels that have at least one pixel of the second color 255 can be present along the image of the door 224 as well as the wall segment 230. As such, histogram of gradient of pattern features of regions of pixels proximate to these groups of pixels can be determined at each point.

The regions can be of a same approximate size as the selection of the image of the sample door. When the regions are of the same approximate size as the selection of the image of the sample door, a more consistent comparison can be made between the histogram of gradient of pattern feature determined for a region and the histogram of gradient of pattern feature determined for the selection of the image of the sample door.

Some embodiments can include determining whether the histogram of gradient of pattern feature of the region of pixels proximate to the group of pixels is within the threshold of the histogram of gradient of pattern feature of the sample door. For example, a comparison of the histogram of gradient of pattern feature of the region of pixels proximate to the group of pixels can be made with the histogram of gradient of pattern feature of the sample door. Upon the comparison, a percentage of similarity can be obtained between the two. In an example, if the histogram of gradient of pattern feature of the region of pixels proximate to the group of pixels meets or exceeds the threshold, the histogram of the region can be stored as a region of pixels (e.g., FIG. 2F, 252).

Figure 2F:
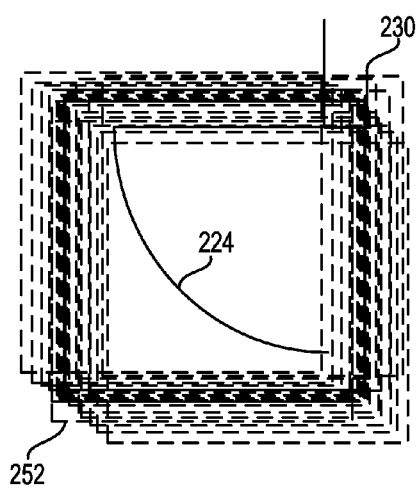
FIG. 2F illustrates a number of regions of pixels that are proximate to one another and are within the threshold of the histogram of gradient of pattern feature of the sample door according to one or more embodiments of the present disclosure.

FIG. 2F illustrates a number of regions of pixels that are proximate to one another and are within the threshold of the histogram of gradient of pattern feature of the sample door according to one or more embodiments of the present disclosure. For example, the percentage of similarity between the histogram of gradient of pattern feature in each of the number of regions of pixels 252 can be within a threshold of 90% of similarity to the histogram of gradient of pattern feature of the sample door. These regions of pixels can be stored as coordinates of the door 224 and/or wall segment 230, for example.

Figure 2G:
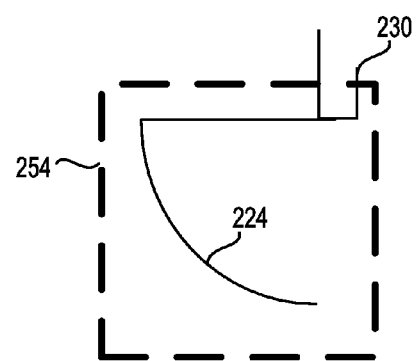
FIG. 2G illustrates a step in determining the location of the door associated with the space.

FIG. 2G illustrates a step in determining the location of the door associated with the space. In some embodiments, detecting the location of the door associated with the space in the image of the floor plan through the histogram of gradient of pattern feature includes combining a number of regions of pixels (e.g., FIG. 2F, 252) that are proximate to one another and are within the threshold of the histogram of gradient of pattern feature of the sample door into a single region 254. The single region 254 can include the door 224 and/or wall segment 230, for example.

In some embodiments, the single region 254 can be stored as the location of the door associated with the space. For example, coordinates of the single region 254 can be obtained and stored as the location of the door associated with the space.

Figure 3:
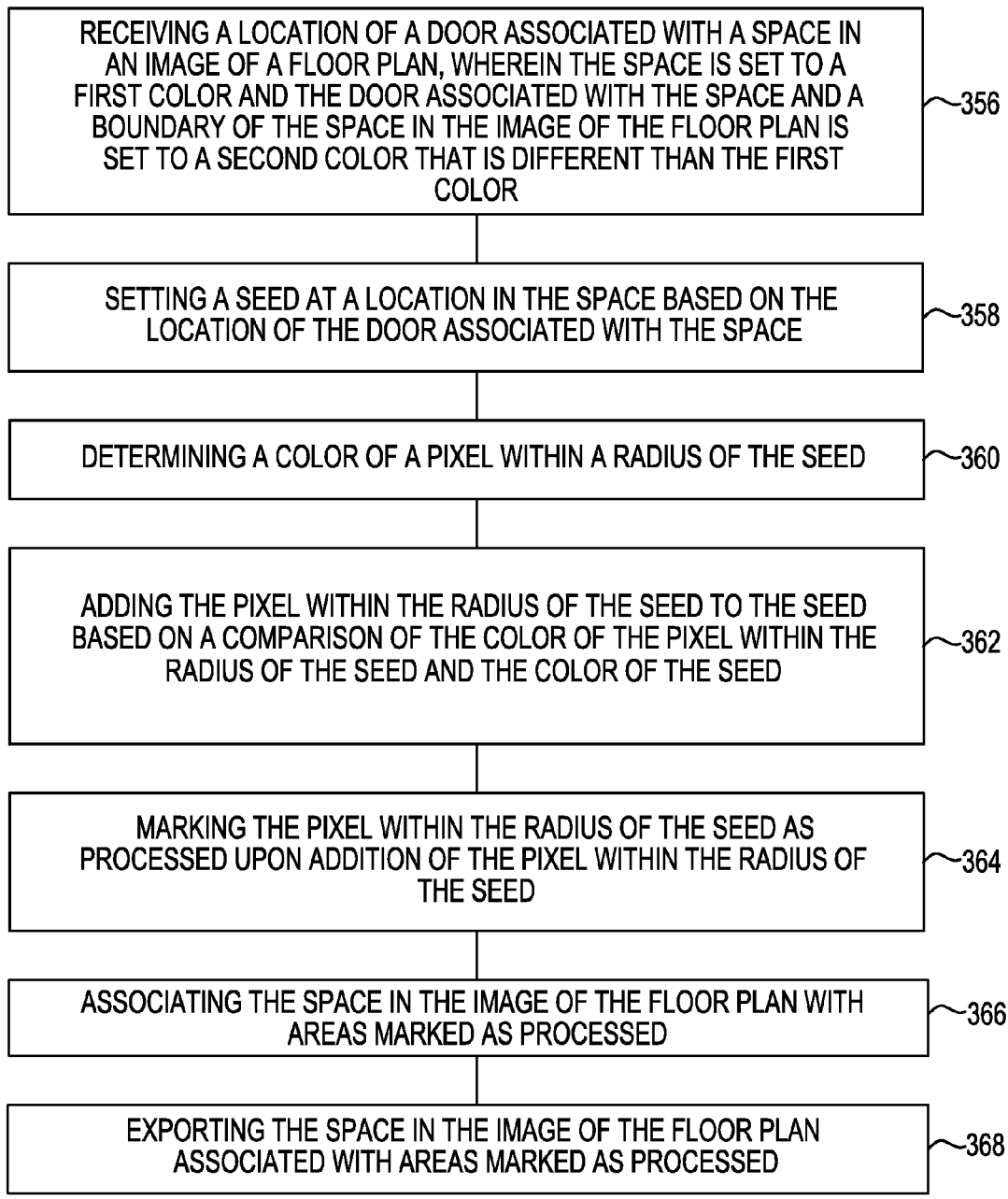
FIG. 3 illustrates a method for face quality analysis according to one or more embodiments of the present disclosure.

FIG. 3 illustrates a method for floor plan space detection according to one or more embodiments of the present disclosure. The method can include, at block 356, receiving a location of a door associated with a space in an image of a floor plan, wherein the space is set to a first color and the door associated with the space and a boundary of the space in the image of the floor plan is set to a second color that is different than the first color. By setting the space to the first color and the door associated with the space and the boundary of the space in the image of the floor plan to the second color, a distinction can be made between the space and the door and boundary of the space when performing floor plan space detection.

In some embodiments, the method can include detecting the location of the door. As discussed herein, the location of the door can be detected through a histogram of gradient of pattern feature.

At block 358, the method includes setting a seed at a location in the space based on the location of the door associated with the space. As discussed herein, the seed can include a pixel. In an example, the pixel that is included in the seed can be marked as processed. For instance, the pixel can be defined as correlating to a space in the image of the floor plan.

In some embodiments, setting the seed in the space can include setting the seed in the space automatically. For example, an instruction can be stored in memory to set the seed a predetermined distance from the location of the door associated with the space.

Alternatively, and/or in addition, setting the seed in the space can include setting the seed in the space manually. In an example, a user can set the seed manually through a user interface by clicking on a location within the space to set the seed.

The method can include determining a color of a pixel within a radius of the seed, at block 360. In an example, a pixel value can be obtained for the pixel within the radius of the seed. A comparison between the pixel within the radius of the seed and the seed can then be made.

At block 362, the method includes adding the pixel within the radius of the seed to the seed based on a comparison of the color of the pixel within the radius of the seed and the color of the seed. In an example, the pixel within the radius of the seed can be added to the seed when the pixel within the radius of the seed is the same color as the seed of the second color (e.g., shares a same pixel value).

The method includes, at block 364, marking the pixel within the radius of the seed as processed upon addition of the pixel within the radius of the seed. This can represent the seed spreading throughout the space. For example, the pixel within the radius of the seed can be marked as processed, thus causing all of the pixels in the enlarged seed to be marked as processed. The seed can spread (e.g., become larger) throughout the space until the seed reaches a boundary of the space, as discussed herein.

The method includes associating the space in the image of the floor plan with areas marked as processed, at block 366. The areas marked as processed can represent the seed that has been spread throughout the space up until the boundary of the space. In an example, associating the space in the image of the floor plan with the areas marked as processed can include associating coordinates of the areas marked as processed (e.g., seed) with the space.

At block 368, the method includes exporting the space in the image of the floor plan associated with areas marked as processed. In an example, coordinates of the space can be exported to another program for further processing.

Figure 4:
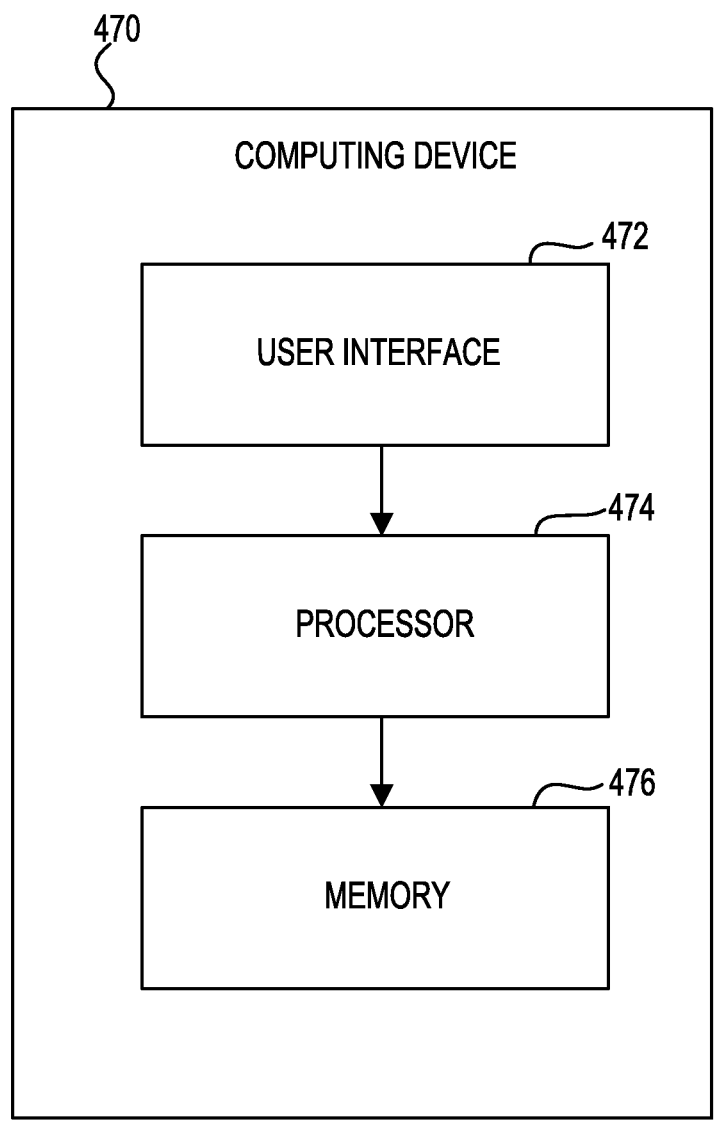
FIG. 4 illustrates a device for floor plan space detection, according to one or more embodiments of the present disclosure.

FIG. 4 illustrates a device for floor plan space detection, according to one or more embodiments of the present disclosure. As shown in FIG. 4, computing device 428 includes a user interface 430. User interface 430 can be a graphic user interface (GUI) that can provide (e.g., display and/or present) and/or receive information (e.g., data and/or images) to and/or from a user (e.g., operator) of computing device 428. For example, user interface 430 can include a screen that can provide information to a user of computing device 428 and/or receive information entered into a display on the screen by the user. However, embodiments of the present disclosure are not limited to a particular type of user interface.

As shown in FIG. 3, computing device 470 includes a processor 474 and a memory 476 coupled to the processor 474. Memory 476 can be volatile or nonvolatile memory. Memory 476 can also be removable (e.g., portable) memory, or non-removable (e.g., internal) memory. For example, memory 476 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 476 is illustrated as being located in computing device 470, embodiments of the present disclosure are not so limited. For example, memory 476 can also be located internal to another computing resource (e.g., enabling computer readable instructions to be downloaded over the Internet or another wired or wireless connection).

Memory 476 can also store executable instructions, such as, for example, computer readable instructions (e.g., software), for floor plan space detection in accordance with one or more embodiments of the present disclosure.

Processor 474 can execute the executable instructions stored in memory 476 in accordance with one or more embodiments of the present disclosure. For example, processor 474 can execute the executable instructions stored in memory 476 to detect a location of a door associated with a space in an image of a floor plan through a histogram of gradient of pattern feature, wherein the space is set to a first color and the door associated with the space and a boundary of the space in the image of the floor plan is set to a second color that is different than the first color.

In some embodiments, the instructions can be executed to set a seed of the second color at a location in the space proximate to the location of the door. Therefore, the door can provide a character for locating the space. As such, the seed can be set in the space based on the location of the door. As discussed herein, the seed can be set manually by a user and/or automatically.

In some embodiments, the instructions can be executed to determine a color of a pixel within a radius of the seed. Alternatively, and/or in addition, a difference in pixel value of the pixel within the radius of the seed and a pixel value of the seed can be determined.

The pixel within the radius of the seed can be added to the seed when the color of the pixel within the radius of the seed has a different color than the seed. When the pixel within the radius of the seed has a different color than the seed, this can indicate that space exists through which the seed can spread (e.g., the space is of the first color and the seed and boundary of the space is of the second color).

In some embodiments, the instructions can be executed to mark the pixel within the radius of the seed as processed upon addition of the pixel within the radius of the seed. As discussed herein this can represent spreading of the seed. The seed can spread up to the boundary of the space, in an example.

Alternatively, and/or in addition, the pixel within the radius of the seed can be added to the seed when the difference between the pixel value of the pixel within the radius of the seed and the pixel value of the seed is within a threshold. In an example, pixels of different colors can be used to form the seed, the space, and the boundary of the space. As such, the pixel values may not be binary (e.g., white, black) and the difference between the pixel values may not be binary (e.g., 0, 1). Accordingly, a predetermined threshold in the difference between the pixel values can be used to determine when to add the pixel within the radius of the seed to the seed of the second color.

In some embodiments, a line of the second color can be placed across a doorway associated with the door. In an example, this can create a boundary across the doorway. Creating a boundary across the doorway can help to ensure that the seed does not spread through the doorway and into an adjacent space.

In some embodiments, the instructions can be executed to associate the space in the image of the floor plan with areas of the second color. For example, the space can be associated with coordinates of the areas of the second color and stored in the memory 476.

Alternatively, and/or in addition, instructions can be executed to export the space in the image of the floor plan associated with areas of the second color in a Building Information Management Industry Foundation Classes (BIM/IFC) format, Green Building Extensible Markup Language (GBXML) format, and/or a Building Information Management Extensible Markup Language (BIMXML) format. Industry Foundation Classes can be an object-based format that can be used for Building Information modeling.

GBXML can be a standard developed to facilitate transfer of building information stored in Computer-Aided Design (CAD) models. BIMXML can describe building data (e.g., sites, buildings, floors, spaces, and equipment and their attributes) in a simplified spatial building model (e.g., extruded shapes and spaces) for BIM collaboration.

Exportation of the space into the various formats can include determining a schema of the different standard (e.g., Bim/IFC, GBXML, BIMXML). The schema can be compiled into an object-oriented class. Compiling the schema into the object-oriented class can be performed by identifying all objects that will be manipulated and how they relate to one another. Once the objects have been identified, they can be generalized as a class of objects. The space can then be represented as an instance of the class of objects. As such, the result can be saved.

In some embodiments, the instructions can be executed to associate a length with a pixel of the image of the floor plan, wherein the length is a physical length associated with the floor plan. In an example, a ruler function can be used to associate the length with the pixel of the image of the floor plan. For instance, a user can drag a ruler on the image to get an image pixel length and then can specify the physical length associated with the floor plan. The physical length associated with the floor plan can then be associated with the image pixel length.

In some embodiments, a dimension of a feature associated with the image of the floor plan can be determined based on the association of the length with the pixel of the image of the floor plan. In an example, the dimension of the feature can be determined when a user makes a selection of a feature for which dimensions are desired. Alternatively, and/or in addition, dimensions associated with the floor plan can be automatically populated for the feature.

Some embodiments of the present disclosure can provide a result checking mechanism to ensure that space information can be determined for all areas in a structure. For example, areas that have not had space determined for them can be indicated on the image of the floor plan with a label that states "Undetected". In an example, the label can be flashing.

In some embodiments, upon completion of a portion of the floor plan space detection (e.g., space has been determined for one or more areas of the floor plan image), areas for which spaces have been determined can be marked with a colored boundary. For example, an area for which space has been determined can be marked with a red boundary while areas for which space has not been detected can remain unmarked.

A morphology analysis can be used to distinguish between the areas marked with the red boundary from areas that are unmarked. In an example, the morphology analysis can detect areas that are unmarked and provide coordinates of the area. Instructions can be executed to provide an indication that space has not been detected for the area. For example, a flashing label that states "Undetected" can be displayed in the area that has not been detected. Alternatively, and/or in addition, the boundary of the area can be set to a color different than the detected spaces (e.g., yellow) and/or the boundary can be displayed as flashing.

For areas that have not had space detected for them, seeds can be manually set in the space. As discussed herein, a user can click on a location in the space to manually set a seed, for example.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A method for floor plan space detection, comprising:
 receiving an image of a floor plan;
 enhancing the image of the floor plan through processing;
 detecting a location of a door associated with a space in the image of the floor plan through a histogram of gradient of pattern feature, wherein the space is set to a first color and the door associated with the space and a boundary of the space in the image of the floor plan is set to a second color different than the first color;
 setting a seed of the second color in the space based on the location of the door associated with the space;
 determining a color of a pixel within a radius of the seed;
 comparing the color of the pixel within the radius of the seed to the color of the seed;
 adding the pixel within the radius of the seed to the seed when the color of the pixel within the radius of the seed has the same color of the seed;
 spreading the seed in the space until the seed reaches a boundary of the space; and
 associating the seed that has been spread with the space.

2. The method of claim 1, wherein:
 receiving the image of the floor plan includes receiving the image of the floor plan as a vector image; and
 enhancing the image of the floor plan through processing includes transforming the vector image into a raster image, performing binarization of the raster image, and bridging unconnected pixels that form lines.

3. The method of claim 1, wherein:
receiving the image of the floor plan includes receiving the image as a raster image; and
enhancing the image of the floor plan includes:
performing binarization of the raster image;
removing noise in the raster image; and
performing a morphology operation to smooth sawtooth edges of lines and bridge unconnected pixels that form lines.

4. The method of claim 1, wherein setting the seed of the second color in the space based on the location of the door associated with the space includes setting the seed of the second color at a location proximate to the door associated with the space.

5. The method of claim 1, further comprising setting a first seed on a first side of the door associated with a first space and a second seed on a second side of the door associated with a second space.

6. The method of claim 1, wherein detecting the location of the door associated with the space in the image of the floor plan through the histogram of gradient of pattern feature includes:
comparing the histogram of gradient of pattern feature of the door associated with the space with a histogram of gradient of pattern feature of a sample door; and
determining whether the histogram of gradient of pattern feature of the door associated with the space is within a threshold of the histogram of gradient of pattern feature of the sample door.

7. The method of claim 6, further comprising:
calculating the histogram of gradient of pattern feature of the sample door by:
receiving a selection of an image of the sample door from the image of the floor plan;
calculating a feature vector of a pixel in the image of the sample door;
determining a pattern among a plurality of feature vectors of a plurality of pixels in the image of the sample door; and
associating the pattern with the image of the sample door to create the histogram of gradient of pattern feature.

8. The method of claim 6, wherein detecting the location of the door associated with the space in the image of the floor plan through the histogram of gradient of pattern feature includes:
detecting a group of pixels that have at least one pixel of the second color;
calculating a histogram of gradient feature of a region of pixels proximate to the group of pixels that have at least one pixel of the second color; and
determining whether the histogram of gradient of pattern feature of the region of pixels proximate to the group of pixels is within the threshold of the histogram of gradient of pattern feature of the sample door.

9. The method of claim 8, further comprising:
combining a number of regions of pixels that are proximate to one another and are within the threshold of the histogram of gradient of pattern feature of the sample door into a single region; and
storing the single region as the location of the door associated with the space.

10. A machine-readable non-transitory medium storing instructions for floor plan space detection, executable by a machine to cause the machine to:
detect a location of a door associated with a space in an image of a floor plan through a histogram of gradient of pattern feature, wherein the space is set to a first color and the door associated with the space and a boundary of the space in the image of the floor plan is set to a second color that is different than the first color;
set a seed of the second color at a location in the space proximate to the location of the door;
determine a color of a pixel within a radius of the seed;
compare the color of the pixel within the radius of the seed to the color of the seed;
add the pixel within the radius of the seed to the seed when the color of the pixel within the radius of the seed has the same color as the seed;
mark the pixel within the radius of the seed as processed upon addition of the pixel within the radius of the seed; and
associate the space in the image of the floor plan with areas marked as processed.

11. The medium of claim 10, further comprising instructions executable to place a line of the second color across a doorway associated with the door.

12. The medium of claim 10, wherein the instructions executable by the machine to compare the color of the pixel within the radius of the seed to the color of the seed include instructions to determine a difference between a pixel value of the pixel within the radius of the seed and a pixel value of the seed.

13. The medium of claim 12, further comprising instructions executable by the machine to add the pixel within the radius of the seed to the seed when the difference between the pixel value of the pixel within the radius of the seed and the pixel value of the seed is within a threshold.

14. The medium of claim 10, further comprising instructions executable by the machine to export the space in the image of the floor plan associated with areas marked as processed in at least one of a Building Information Management Industry Foundation Classes format, Green Building Extensible Markup Language format, and a Building Information Management Extensible Markup Language format.

15. The medium of claim 10, further comprising instructions executable by the machine to:
associate a length with a pixel of the image of the floor plan, wherein the length is a physical length associated with the floor plan; and
determine a dimension of a feature associated with the image of the floor plan based on the association of the length with the pixel of the image of the floor plan.

16. A method for floor plan space detection, comprising:
receiving a location of a door associated with a space in an image of a floor plan, wherein the space is set to a first color and the door associated with the space and a boundary of the space in the image of the floor plan is set to a second color that is different than the first color;
setting a seed at a location in the space based on the location of the door associated with the space;
determining a color of a pixel within a radius of the seed;
adding the pixel within the radius of the seed to the seed based on a comparison of the color of the pixel within the radius of the seed and the color of the seed;
marking the pixel within the radius of the seed as processed upon addition of the pixel within the radius of the seed;
associating the space in the image of the floor plan with areas marked as processed; and
exporting the space in the image of the floor plan associated with areas marked as processed.

17. The method of claim 16, wherein setting the seed in the space includes setting the seed in the space automatically.

18. The method of claim 16, wherein setting the seed in the space includes setting the seed in the space manually.

19. The method of claim 16, further comprising detecting a location of the door associated with the space in the image of the floor plan through a histogram of gradient of pattern feature.

* * * * *